United States Patent [19]
Montierth et al.

[11] Patent Number: 4,791,277
[45] Date of Patent: Dec. 13, 1988

[54] HEATING AND INSULATION ARRANGEMENT FOR A NETWORK OF INSTALLED PIPES AND METHOD

[76] Inventors: Garry L. Montierth, 5004 Wembley Ct., Newark, Calif. 94560; Robert O. Bylin, 1112 Lassen Dr., Belmont, Calif. 94002; Raymond J. Scott, P.O. Box 2343, Redwood City, Calif. 94064

[21] Appl. No.: 12,444
[22] Filed: Feb. 9, 1987
[51] Int. Cl.⁴ .............................................. H05B 3/58
[52] U.S. Cl. ..................................... 219/535; 219/301; 29/611
[58] Field of Search ............... 219/535, 301, 536; 29/611, 455 R; 138/33; 165/164; 264/45; 403/397

[56] References Cited

U.S. PATENT DOCUMENTS

| | | | |
|---|---|---|---|
| Re. 29,332 | 8/1977 | Bilbro et al. ....................... | 165/164 |
| 3,793,411 | 2/1974 | Stonitsch et al. .................. | 264/45 |
| 3,834,458 | 9/1974 | Bilbro et al. ....................... | 165/164 |
| 3,949,189 | 4/1976 | Bilbro et al. ....................... | 219/301 |
| 3,971,416 | 7/1976 | Johnson ............................. | 219/301 X |
| 4,031,611 | 6/1977 | Johnson, Jr. ....................... | 29/611 |
| 4,068,966 | 1/1978 | Johnson et al. .................... | 403/397 |
| 4,843,386 | 11/1984 | Stonitsch .......................... | 29/455 R |

Primary Examiner—E. A. Goldberg
Assistant Examiner—M. M. Lateef
Attorney, Agent, or Firm—Flehr, Hohbach, Test, Albritton & Herbert

[57] ABSTRACT

A technique for installing and replacing, if necessary, readily bendable electrical heat-tracing cable on and insulating a network of installed pipes including straight sections, straight joints, and elbow sections is disclosed herein. In accordance with this technique, initially provided heat-tracing cable is installed in individual continuous sections along the length of and adjacent to the straight pipe sections, joints and elbow sections. Routing guides are placed over and/or under lengthwise surfaces of at least those segments of the heat-tracing cable adjacent to the joints and elbows and retained in place along with the cable itself. With the cable and routing guides so retained, a layer of thermal insulation is placed over the network of pipes as well as the cable and routing guides so that opposite ends of individual cable sections are readily accessible for connection with the source of electrical power or a section of replacement cable.

31 Claims, 3 Drawing Sheets

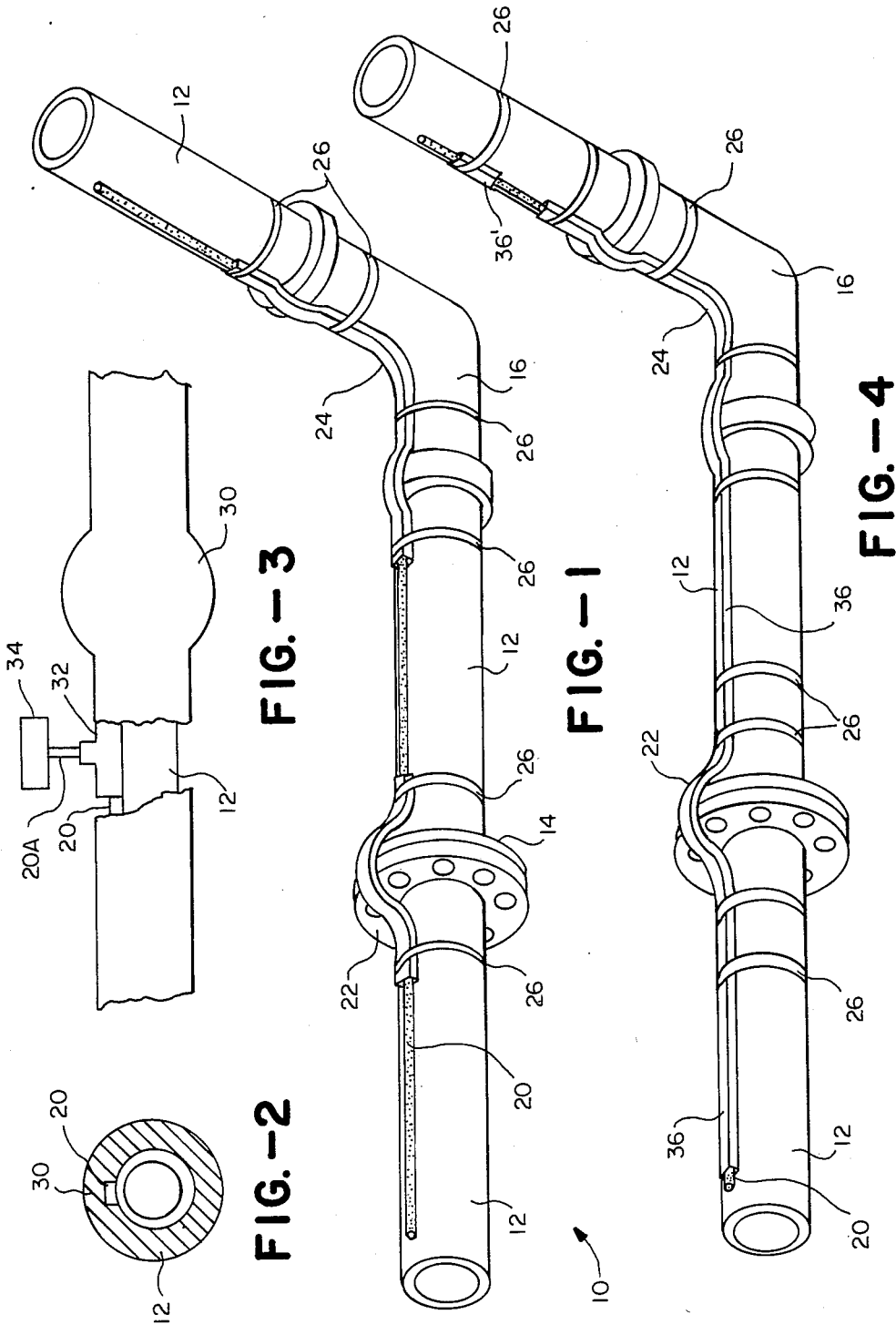

HEATING AND INSULATION ARRANGEMENT FOR A NETWORK OF INSTALLED PIPES AND METHOD

The present invention relates generally to the utilization of heat-tracing cable for keeping fluid conveyance pipes warm, and more particularly to a technique for installing and replacing heat-tracing cable on and insulating a network of already installed pipes.

Electrical heat-tracing cables are widely used in the commercial, industrial and process industries for freeze protection and process temperature maintenance of piping systems. The ease of initial installation has made them the heat-tracing of choice for many applications. Historically, electrical heat-tracing cable has been installed on piping in the following manner. The cable is taped or fastened at regular intervals (i.e., 12–18 inches) to the piping system with cable ties or other fasteners. An outer thermal insulation jacket is applied over the cable and piping system to minimize thermal losses to the environment. For outdoor use, a watertight protective cover is often installed over the insulation jacket.

While the prior art heat-tracing technique described immediately above appears to be satisfactory for its intended use as a means of heating a network of pipes, it does have a particular drawback. Specifically, in the case where a heat-tracing cable or a section thereof fails or otherwise necessitates replacement, the watertight barrier, insulation jacket, cable fastening tape or ties and the cable to be replaced must all be removed before a new heat-tracing cable can be installed. An arrangement that might minimize this drawback is described in N.C. Johnson U.S. Pat. Nos. 3,971,416 and 4,031,611. These patents describe a preinsulated pipe assembly and pipeline and a method of making a preinsulated pipe assembly. According to these patents, individual straight sections of preinsulated pipe are formed at a manufacturing site and thereafter installed in the field. Each preinsulated pipe is actually an assembly comprised of the pipe itself, a heater housing mounted with the pipe so as to form a continuous cavity along the exterior of the pipe and, a preformed insulation layer mounted over the pipe and heater housing. Later, in the field, these individual preinsulated pipe assemblies are interconnected and heating elements are thereafter threaded through the cooperating cavities defined by cooperating heater housings.

The Johnson approach described in U.S. Pat. Nos. 3,971,416 and 4,031,611 is directed to preinsulated pipe assemblies only, that is, pipe assemblies that are first made at the manufacturing site and thereafter assembled in the field. The approach does not address itself to insulating techniques in the field. Moreover, the Johnson technique requires heater housings along all sections of pipe forming the overall network. This can be time-consuming and expensive.

In view of the foregoing, an object of the present invention is to provide an uncomplicated, economical, and yet reliable technique for both heating and insulating a network of already installed pipes in the field, which pipes include straight sections, straight joints and elbow sections, the latter including sections for making a turn such as a T-joint, 90° elbow, 45° elbow, and the like.

A more specific object of the present invention is to provide a heating and insulating technique, in the field, which places heat-tracing cable against the installed pipes to be heated and insulation over the pipes and cable, and specifically a technique in which a section or sections of the heat-tracing cable can be readily replaced without having to rip and remove or otherwise damage the insulation layer surrounding the cable section or sections to be replaced.

Another particular object of the present invention is to provide a heating and insulating technique of the last-mentioned type without having to utilize routing guides throughout the network of pipes.

A further particular object of the present invention is to provide uncomplicated and yet reliable ways of routing electrical heat-tracing cable around straight joints and elbow sections of already installed pipes between the joints and elbow sections and the insulation layer.

Still a further particular object of the present invention is to provide an uncomplicated and yet reliable way of ensuring that electrical heat-tracing cable used to heat pipes makes good contact with the pipes so as to efficiently transfer heat therebetween.

As indicated above, the heating and insulating arrangement disclosed herein is designed for a network of previously installed pipes including straight sections, straight joints and elbow sections and utilizes readily bendable electrical heat-tracing cable, typically in a number of separate continuous sections where the network of pipes is relatively large. For purposes herein, the term "elbow section" refers to not only 90° elbow forming part of a typical network of pipes but also T-joints, 45° elbows or any other section or coupling that makes a turn in the network.

As will be described in more detail hereinafter, in the heating and insulating technique disclosed herein, the electrical heat-tracing cable is positioned along the lengths and adjacent to the straight pipe sections, joints and elbow sections and routing guides are positioned adjacent to lengthwise surfaces of at least those segments of the cable adjacent to the joints and elbow sections. In a preferred embodiment, the routing guides are positioned adjacent to lengthwise surfaces of only those segments of the cable adjacent to joints and elbow sections so that segments of the cable adjacent to straight pipe sections lie directly against the latter. While the cable and routing guides are retained in these positions, a layer of thermal insulation is placed over all of the straight pipe sections, joints and elbow sections as well as the retained cable and routing guides so that opposite ends of the individual cable sections are readily accessible for connection with a source of electrical power and/or a replacement cable section. In the event that any single continuous initially installed section of the cable is to be replaced, it is only necessary to connect one end of a new replacement cable section to an accessible end of the cable section to be replaced. Thereafter, this latter cable section can be pulled out from within its insulation layer by its otherwise free end. This, in turn, causes the replacement cable section to be pulled into the position vacated by the cable section being replaced. Note that this is possible without disturbing the insulation layer and further that it is not necessary to include routing guides throughout the extent of the pipe network but rather only along the joints and elbow sections.

The present technique and additional features will be described in detail hereinafter in conjunction with the drawings wherein:

FIG. 1 is a perspective view of part of a network of already installed pipes in combination with a heating and insulating arrangement designed in accordance with the present invention, the arrangement shown in FIG. 1 being illustrated without insulation for purposes of clarity;

FIG. 2 is a cross-sectional view of a section of straight pipe forming part of the network and arrangement illustrated in FIG. 1, specifically including a layer of insulation forming part of the overall heating and insulation arrangement;

FIG. 3 is a diagrammatic illustration, in side elevation, of a section of the network of FIG. 1, specifically illustrating a joint and the way in which electrical heat-tracing cable forming part of the heating and insulating arrangement is connected to a source of power;

FIG. 4 is an illustration similar to FIG. 1 (without insulation) but showing a heating and insulating arrangement designed in accordance with a second embodiment of the present invention;

Figure 5:
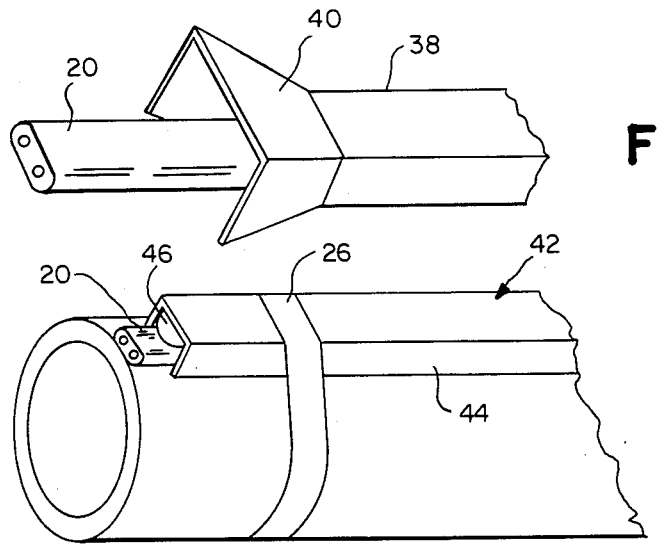
FIG. 5 is a perspective view of one end of a routing guide forming part of the arrangement of FIG. 1 or the arrangement of FIG. 4, specifically including an entry guide.

Turning now to the drawings, wherein like components are designated by like reference numerals throughout the various figures, attention is first directed to FIG. 1 which illustrates part of an overall network 10 of installed pipes, conduit or other such material (either fluid or solid) tubes (hereinafter merely referred to as pipes) including straight sections 12, straight joints, one of which is shown at 14, and elbow sections, one of which is shown at 16. In the particular embodiment illustrated, elbow section 16 is a 90° elbow. As indicated above, the overall network could include other types of elbow sections including T-joints, 45° elbows, and the like.

FIG. 1 in conjunction with FIGS. 2 and 3 also illustrates an arrangement designed in accordance with the present invention for heating and insulating network 10. This arrangement includes conventional or otherwise readily providable and readily bendable electrical heat-tracing cable, in individual continuous sections. One such section, generally indicated at 20, is shown in FIG. 1 positioned along the lengths of staight pipe sections 12, straight joint 14 and elbow 16. The heating and insulating arrangement also includes routing guides positioned adjacent to lengthwise surfaces of those segments of cable 20 adjacent to the joints and elbows. In the embodiment illustrated in FIG. 1, a routing guide 22 having a closed (box-shaped) cross section is shown over, under and around a cable segment adjacent to joint 14 and an inverted U-shaped routing guide 24 is shown over and/or around the cable segment adjacent to elbow 16. Note specifically that there are no routing guides positioned adjacent to those segments of cable 20 adjacent to straight pipe sections 12.

Figure 9:
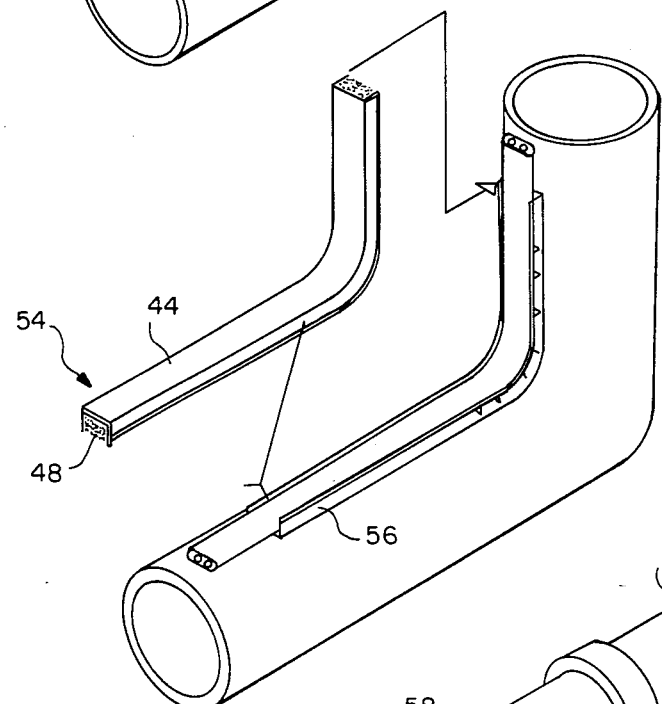
FIG. 9 is an enlarged perspective view of a routing guide which may form part of the arrangement of FIGS. 1 or 4 and which is designed in accordance with still another embodiment of the present invention.

Each of the routing guides 22 and 24 illustrated in FIG. 1 is sufficiently rigid to retain its shape but is preferably readily bendable in the field, either manually or by a suitable tool, although the guides could be preformed at a manufacturing facility. Guide 22 is preferably generally box-shaped cross sectional configuration so as to include side walls on opposite sides of the cable segment and a bottom and top wall under and over the cable segment. Guide 24 is also U-shaped but inverted so that its top will rest directly above the cable segment. Each routing guide may be longitudinally configured (either in the field or the manufacturing site) in a way which depends upon the configuration of its cooperating joint or elbow section and does not necessarily have to be box-shaped or U-shaped. That is, for guides requiring a convex bend or convex bend component, the bottom of the channel must be closed. For guides with concave bends or bend components then the top must be closed. In the case of guide 22, it runs around the flanged section of the joint and includes compound bends. For compound bends such as with guide 22, which has both a convex and concave bend component, at least part of the guide must be closed on the top and other parts closed on the bottom. Guide 22 could be made to include these complex sections. In the case of guide 24, it bends at a right angle with elbow 16. In both cases, as will be seen hereinafter, the routing guides serve to allow cable section 20 to be readily removed and a new replacement cable to take its position. As a practical matter, in a preferred embodiment, the guides for joints and elbow sections are box-shaped or otherwise closed in cross-sectional configuration. In this regard, a multipiece guide arrangement of the general type shown in FIG. 9 is preferred.

Cable section 20 and the routing guides 22 and 24 are retained in their respective positions shown in FIG. 1 by means of tape, metal or expandable or elastic-type bands or clamps (hereinafter merely referred to as bands) generally indicated at 26. Note however that the bands extend around the routing guides only and not the cable itself. In this way, the bands do not prevent one cable section from being removed and replaced with another, as will become apparent. Also, as will be seen, in some cases an expandable elastic band can be used to bias (i.e., press) cable section 20 against its adjacent pipe section.

The present overall heating and insulating arrangement also includes one or more layers of insulation 30, for example polyurethane foam insulation or one or more layers of conventional fiberglass insulation, over the network of pipes including straight sections, joints and elbow sections as well as cable 20 and the routing guides, as illustrated in FIGS. 2 and 3. In actual practice, in accordance with the present invention, cable 20 is first installed over a network of pipes along with cooperating routing guides, as illustrated in FIG. 1, and both the cable and routing guides held in place by means of bands 26. Thereafter, insulation layer 30 is applied over the network of pipes, the cables, routing guides and bands in a conventional manner. In any event, opposite ends of each cable section not connected with another cable section must be readily accessible for connection with a source of electrical power or, if necessary, with a subsequent replacement cable. Note that some kinds of electrical heating cables only require connection with a source of electrical power at one end (i.e., a parallel circuit construction) while others require connection at both ends (i.e. a series circuit construction). However, both ends need to be accessible to allow for easy cable replacement. FIG. 3 illustrates an accessible cable end section 20A which is routed out through insulation layer 30 by means of a termination fitting 32 which will be discussed in conjunction with FIG. 8. The free end of section 20A is shown connected to a suitable source of electrical power 34.

With particular reference to FIG. 2, it should be noted that those segments of cable section 20 directly adjacent to straight pipe sections 12 rest directly against the pipe sections between the latter and insulation layer 30 with no routing guide therebetween. In this regard, it is to be understood that the insulation layer 30 is to be selected so that by pulling on an accessible end of the heat-tracing cable section 20, for example accessible end 20A, the insulation layer will allow the heat-tracing cable to pull out from under the insulation without damaging the latter in any significant way. A preferred insulation that allows for this is conventional preformed fiberglass such as supplied by KNAUF Company. At the same time, this insulation when wrapped around the pipe and cable sections has a degree of resiliency that is sufficient to press down against the top side of the cable so as to press the latter against pipe sections 12. In other words, the insulation itself acts as a biasing means to bias (i.e., press) the heat-tracing cable is engagement with the straight pipe sections so as to provide sufficient heat transfer between the two.

The overall heating and insulating arrangement described above in conjunction with FIGS. 1-3 is especially suitable for replacing a section of heat-tracing cable, if necessary, especially those in inaccessible areas. Common examples of inaccessible areas frequently encountered in the field are pipe closets or pipeways; closets where structures are built around pipe networks once they have been installed (building - hot water systems); and pipes buried in soil or concrete, etc. This is accomplished by connecting one end of the replacement cable (section) to one accessible end of the cable (section) to be replaced. The other accessible end of the cable to be replaced is pulled out of its operating position. As it does so, the replacement cable automatically moves into the space vacated by the cable removed. In the case of the arrangement illustrated in FIG. 1, the routing guides 22 and 24 serve to guide both cables past joint 14 and elbow section 16. Note that as the cable being replaced is moved out of its operating position, it bears against the top surface of guide 24 (concave bend) and both the top and bottom surface of guide 22 (both concave and convex components). That is why guide 24 is closed over the cable and guide 22 is locally closed both under and over it. Since the replacement cable immediately follows the cable being replaced, the former easily moves into the spaces between straight pipe sections 12 and insulation layer 30 previously occupied by the latter cable, that is, the one being replaced. In the case of insulation having its own biasing capabilities, it is important to make sure that the replacement cable immediately moves into position directly behind the cable being replaced so that the space for it does not close. Moreover, the joint at the connecting point between the two cables should define a low profile, that is, preferably it should be no greater in cross section than the cable sections themselves. While larger cross sections can be handled up to the cross section of the routing guide, they are not preferred. This can be accomplished by, for example, soldering the ends together.

FIG. 4 illustrates the same network of already installed pipes including straight sections 12, straight joint 14 and elbow section 16. In addition, FIG. 4 illustrates a modified heating and insulating arrangement. This latter arrangement is identical to the one described in FIG. 1 to the extent that it includes the same cable 20, routing guides 22 and 24, band 26 and insulation layer 30, although the insulation layer is not shown. The only difference between the arrangement in FIG. 4 and the arrangement in FIG. 1 is that the former arrangement also includes inverted U-shaped routing guides 36 extending along the lengths of straight pipe sections 12. While these latter routing guides are shown as continuous extensions of guide 24, they do not have to be. In either case, they are preferably an inverted U-shape in cross section so as to place adjacent cable section as close to its associated pipe section as possible, as will be discussed in more detail in FIGS. 6, 7, 7A and 7B. The arrangement illustrated in FIG. 4 may be installed in the same manner as the arrangement shown in FIG. 1. That is, once the heat-tracing cable and routing guides are in place, the entire network of pipes, the cable and the routing guides can be covered with an insulation layer 30.

Still referring to FIG. 4, while the routing guides 36 are shown as being U-shaped, as indicated above, they could also be box-shaped or otherwise closed in cross section. Moreover, while each routing guide 36 associated with a particular straight pipe section 12 is itself continuous, shorter spaced-apart guides can be used with each straight pipe section as shown at 36' in FIG. 4.

FIG. 5 illustrates one possible end configuration of a routing guide which is generally indicated at 38. The particular routing guide end includes an outwardly flared end section 40 which serves as an entrace guide for a replacement cable as the latter is caused to pass therethrough during the replacement procedure. More specifically, the entry guide prevents the heat-tracing cable from catching on the edge of the guide as it moves therethrough. Routing guide end 38 can be an integral part of an associated guide or it can be a separate member engagable over or within a separate guide to form a temporary end section thereof.

Figure 6:
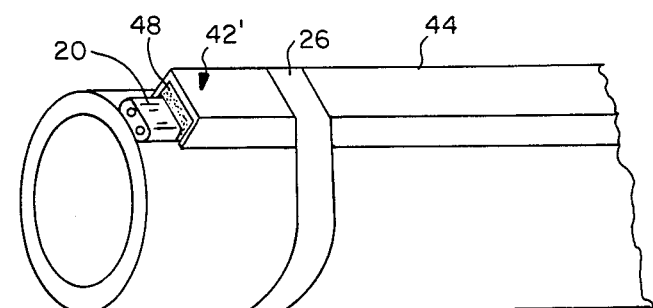
FIG. 6 is an enlarged perspective view of a routing guide designed in accordance with one embodiment of the present invention.

Referring to FIG. 6, one end section of another routing guide 42 is illustrated. This routing guide is similar to routing guides 24 and 36 to the extent that it includes a relatively rigid, but preferably bendable, longitudinally extending channel member 44 having a generally inverted U-shaped cross section. However, guide 42 which is preferably used along straight pipe sections 12 rather than the joints and elbow sections, also includes either one continuous or a number of spaced spring elements 46 disposed within channel member 44 between the latter and a segment of cable 20 within the guide, as illustrated in FIG. 6. The spring element is generally C-shaped in configuration and is positioned so as to urge the cable segment within the guide against the cooperating pipe section 20. The spring element, if continuous, extends the entire length of its associated guide. If a number of separate elements are used, they are preferably spaced uniformly along the length of the guide. Routing guide 42 is especially helpful when used in conjunction with guides 36 associated with straight pipe sections 12 since the cable segments along these sections can be more readily placed against the underlying straight pipe sections than is possible with regard to joint 14 and elbow section 16.

Figure 7:
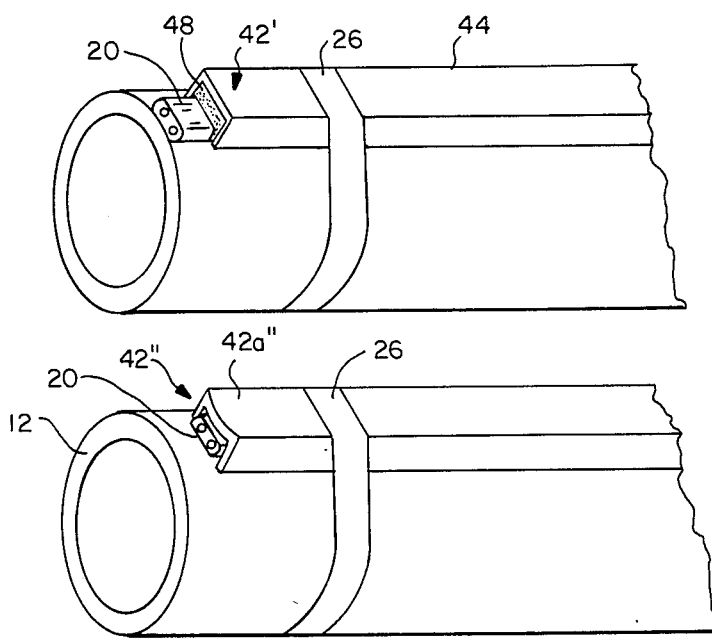
FIGS. 7, 7A and 7B are enlarged perspective views of routing guides designed in accordance with three additional embodiments of the present invention.

FIG. 7 illustrates a modified routing guide 42'. This guide includes an identical channel member 44 but does not use a spring element or elements 46. Rather, the channel member 44 is filled with a resilient material 48, for example silicone rubber foam, which serves the same purpose as elements 46. That is, the resilient material 48 biases its cooperating cable segment downward, as illustrated in FIG. 7. In this particular embodiment, it is preferable if the entire channel segment is filled with resilient material, although individual spaced-apart sections could be provided.

Figure 7A:
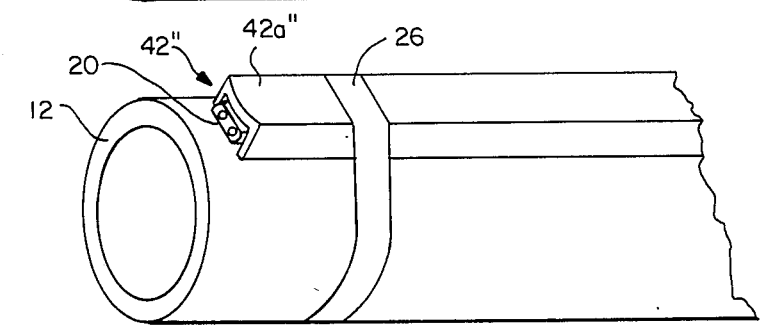

In FIG. 7A still another modified routing guide 42" is shown. This guide is also of a generally inverted U-shaped configuration. However, the top side 42a" is itself designed to provide spring action against a cooperating cable section 20. This is accomplished by forming the guide as an integral unit, preferably of spring-type material, with the top side inwardly bowed, as shown, sufficient to engage cable section 20 thereunder. This in turn biases the cable section against pipe section 12.

Figure 7B:
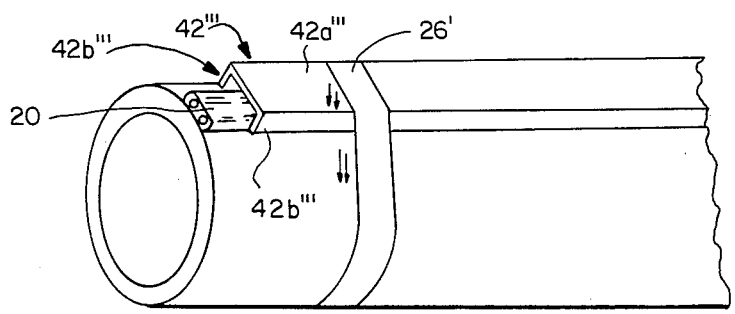

In FIG. 7B a further routing guide 42''' is shown, again as a generally inverted U-shaped channel. However, the legs 42b''' of the channels are sufficiently short so that its top side 42a''' rests directly against the top side of cable section 20. A resilient band 26' is used to force top side 42a''' downward against cable section 20, as indicated by the arrows, which band in turn forces or biases the cable section against pipe section 20.

All of the routing guides 42, 42', 42" and 42''' illustrated in FIGS. 6, 7, 7A and 7B have been shown including U-shaped channels or guide members. While not as efficient from a thermal transfer standpoint, these channels or guide members could be box-shaped or otherwise closed in cross section. In each of these cases, the heat-tracing cable would be urged in the direction of but not against its associated pipe section. In the case of channel member 44 shown in FIGS. 6 and 7, they could be one-piece member, although they would preferably be made of two sections, as exemplified in FIG. 9 (although straight rather than curved). In the case of the channel members shown in FIG. 7B, they would have to be made of two sections, an upper section containing the biasing means and a separate lower section.

Figure 8:
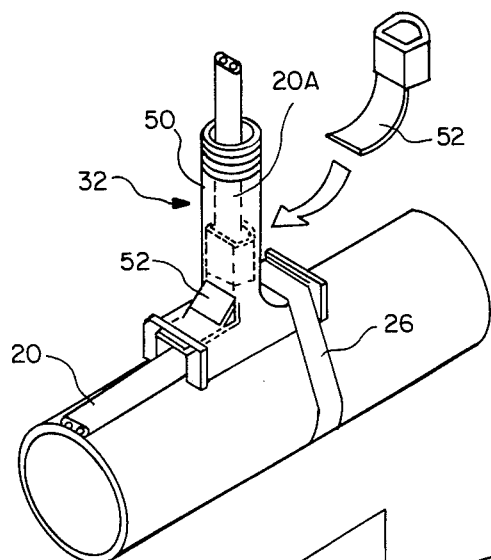
FIG. 8 is an enlarged perspective view of an electrical terminal fitting which may form part of the arrangement of FIGS. 1 or 4 and which is designed in accordance with the present invention.

Turning now to FIG. 8, attention is directed to termination fitting 32. As stated previously in conjunction with FIG. 3, this fitting is utilized to guide an end section of cable 20, for example end segment 20A, out of its insulation layer 30 (not shown in FIG. 8) so that it can be attached to a suitable source of electrical power or directly to a replacement cable. As illustrated in FIG. 8, this fitting includes a fitting body 50 which is T-shaped in configuration so as to guide end section 20A of cable 20 out of insulation layer 30 at a right angle. In this regard, the bottom end portion of fitting 50 is retained against its cooperating pipe section 12 by means of a retaining band 26. A flexible metal or plastic insert 52 is disposed within body 50 or body 50 may be so constructed as to serve as or provide a smooth guide surface for pulling the cable through body 50 in the event the cable must be removed for replacement thereof.

FIG. 9 illustrates a routing guide 54 which is similar to routing guide 42' shown in FIG. 7 to the extent that it includes a channeled member 44 and cable biasing material 48. However, guide 54 includes an underside in the form of a complementary channel member 56 which is configured to rest directly against its cooperating joint, elbow section or even straight pipe section. Underside 56 is configured to receive cable 20 and disengagably connect to channel member 44 in a friction tight manner. Because routing guide 54 includes both an underside and a top side, it can be used at both concave curved applications (i.e., fitting 16) and convex curved applications (i.e., joint 14). When guide 54 is used across joints and fittings, it is preferable to eliminate biasing material 48, thereby placing the cable section therein in direct communication with either its top side or underside to minimize resistance to cable movement if cable replacement becomes necessary.

Figure 10:
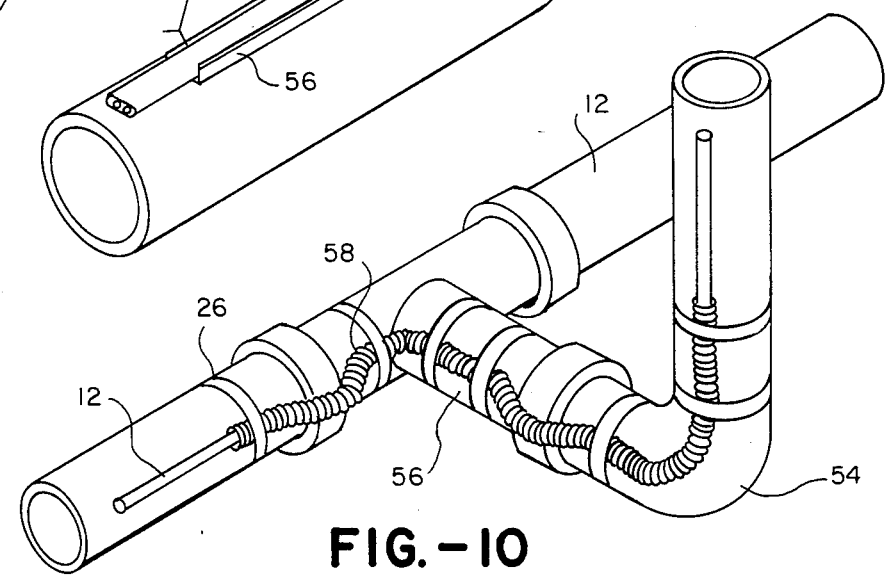
FIG. 10 is an illustration similar to FIG. 1 (without insulation), including a T-joint and routing guide in the form of convoluted tubing in a complex piping arrangement depicting a further embodiment of the present invention.

Finally, attention is directed to FIG. 10 which illustrates a network of pipes including two straight pipe sections 12, part of a right angle elbow section 54, and a second elbow section in the form of a T-joint 56. In addition, this figure illustrates a routing guide 58 in the form of a continuous length of convoluted tubing or other such tubing that is flexible or readily bendable along a tortuous path. Tubing that is flexible or readily bendable manually can be made to easily follow a tortuous path along one pipe section 12, a section of T-joint 56 and an elbow section 54. The convoluted tubing is held in place by means of a series of bands 26. Routing guide 58 can be used in place of one or all of the routing guides described previously. However, it is preferably used only in those areas where tortuous paths are required since it is less efficient from a heat transfer standpoint than the previously described guides.

In addition to the foregoing, it should be specifically noted that the present invention incorporates a number of different features in several different embodiments. For example, FIG. 1 describes a network 10 which includes routing guides adjacent straight joints and elbow sections only not adjacent straight pipe sections. Moreover, the routing guides are shown as either locally U-shaped or inverted U-shaped channel members so that the associated heat-tracing cable is either exposed locally upwardly or downwardly. These routing guides could be entirely closed, as illustrated in FIGS. 9 and 10. The FIG. 9 embodiment is preferable from the standpoint of installation since the routing guide and heat-tracing cable do not have to be combined before the heat-tracing cable is installed against its associated elbow or joint. In FIG. 4, those heat-tracing cable segments adjacent straight pipe sections also include routing guides. Those routing guides preferably include open bottoms, for example as shown in FIGS. 6, 7, 7A and 7B. This is not an absolute necessity. Routing guides similar to the one illustrated in FIG. 9, that is, a two-piece guide could be utilized also, although this is not preferred. As indicated above, the network of previously installed pipes could include pipes, conduits or tubes of any type for conveying either fluids (gases and/or liquids) or solids, for example particulate material.

What is claimed is:

1. A method of installing readily bendable electrical heat-tracing cable on and insulating a network of already installed pipes including straight sections of pipes, straight joints, and elbow sections, said method comprising the steps of:

(a) placing said heat-tracing cable along the lengths of and adjacent to said straight pipe sections, said joints and said elbow sections;

(b) providing routing guides over and/or under the lengthwise surfaces of those segments of said cable adjacent to said joints and elbows;

(c) retaining said cable and routing guides in place adjacent to said straight pipe sections, said joints and said elbow sections;

(d) while said cable and routing guides are so retained, placing a layer of thermal insulation over said straight pipe sections, said joints, and said elbow sections as well as the retained cable and routing guides so that the cable is readily accessible at one or both ends thereof for connection with a source of power;

(e) acting on those segments of said heat tracing cable adjacent said straight pipe sections in a specific way which causes the undersides of the cable segments acted upon to be pressed directly against their adjacent straight pipe sections along substantially the entire length of those cable segments; and (f) retaining said heat-tracing cable adjacent said straight pipe sections, said straight joints and said elbow sections in a way which allows segments of said cable to be replaced with new segments of cable which are acted upon in the same manner as the cable segments being replaced by pulling each cable segment to be replaced out of its originally installed position as a replacement cable is pulled therein.

2. A method according to claim 1 wherein routing guides are not provided over those segments of said cable adjacent to said straight pipe sections such that said last-mentioned cable segments lie directly between their adjacent straight pipe sections and thermal insulation and wherein said thermal insulation is of the type that acts on said last-mentioned cable segments in said specific way which causes the adjacent cable segments to be pressed against their adjacent pipe sections, said layer of thermal insulation also being designed so that the segments of cable positioned directly between said straight pipe sections and adjacent insulation can be replaced with new segments of cable without damaging the insulation by pulling each cable segment to be replaced out of its position adjacent to an associated straight pipe section as a replacement cable segment is pulled therein.

3. A method according to claim 2 wherein said layer of thermal insulation is designed so that the segments of cable positioned directly between said straight pipe sections and adjacent insulation can be replaced with new segments of cable without damaging the insulation by pulling each cable segment to be replaced out of its position adjacent to an associated straight pipe section as a replacement cable segment is pulled therein.

4. A method according to claim 1 wherein routing guides are provided over and not under the outer lengthwise surfaces of those segments of said cable adjacent to said straight pipe sections, said last mentioned routing guides being designed to act on said last-mentioned cable segments in said specific way which causes the adjacent cable segments to be pressed against their adjacent pipe sections.

5. A method according to claim 4 wherein each of said last-mentioned routing guides extends continuously over its associated cable segment.

6. A method according to claim 1 wherein said routing guides positioned adjacent said joint and elbows are manually bendable tubes positioned around their respective cable segments.

7. A method according to claim 6 wherein said tubes are flexible tubes.

8. A method according to claim 7 wherein said flexible tubes are convoluted tubes.

9. A method according to claim 1 wherein routing guides are provided over the outer lengthwise surfaces of those segments of said cable adjacent to said straight pipe sections, each of said last mentioned routing guides consisting of a plurality of spaced segments thereof.

10. A heating and insulating arrangement for a network of previously installed pipes including straight sections of pipes, straight joints and elbow sections, said arrangement comprising:

(a) readily bendable electrical heat-tracing cable, in individual continuous sections, positioned along the lengths of and adjacent to said straight pipe sections, said joints and said elbow sections;

(b) routing guides positioned over and/or under the lengthwise surfaces of only those segments of said cable adjacent to said joints and elbows so that segments of said cable adjacent to said straight pipe sections lie directly against their adjacent straight pipe sections;

(c) means for retaining said cable and routing guides in place adjacent to said joints and said elbow sections; and (d) a layer of thermal insulation over said straight pipe sections, said joints, and said elbow sections as well as the retained cable and routing guides such that opposite ends of said individual cable sections are readily accessible for connection with a source of power and/or a replacement cable section, said layer of thermal insulation being configured so that the segments of cable positioned directly between said straight pipe sections and adjacent insulation can be replaced with new segments of cable without damaging the insulation by pulling each cable segment to be replaced out of its position adjacent to an associated straight pipe section as a replacement cable segment is pulled therein, said layer of thermal insulation also being configured so as to act on those segments of said heat-tracing cable adjacent said straight pipe sections including replacement sections in a specific way which causes the undersides of the cable segments acted upon to be pressed directly against their adjacent straight pipe sections along substantially the entire length of those cable segments.

11. An arrangement according to claim 10 wherein said routing guides are manually bendable tubes.

12. An arrangement according to claim 11 wherein said tubes are flexible tubes.

13. An arrangement according to claim 12 wherein said flexible tubes are convoluted tubes.

14. An arrangement according to claim 10 wherein at least one of said routing guides includes a pair of confronting lengthwise sections disengagably connected to one another to form said guide.

15. An arrangement according to claim 10 including an electrical terminal guide for each end of each cable section whether it is to be connected to said source of power or not, each terminal guide including an elbow-type fitting for containing a part of its associated cable section in an angled position to allow the heat-tracing cable to exit the thermal insulation layer.

16. In a heating and insulating arrangement for a network of installed pipes including straight pipe sections, segments or electrical heat-tracing cable directly adjacent to said pipe sections, channel assemblies positioned over but not under the lengthwise surfaces of said cable segments, and thermal insulation over said pipe sections, heat-tracing cable segments and channel members, the improvement comprising means forming part of said channel assemblies for pressing the adjacent cable segments directly against their respective pipe sections, said channel assemblies including channel members and wherein said pressing means including resilient spring members between a surface of said channel member and the outer lengthwise surfaces of the cable segments under said members.

17. A method of installing and replacing readily bendable electrical heat-tracing cable on and insulating a network of already installed pipes including straight sections of pipes, straight joints, and elbow sections, said method comprising the steps of:
(a) installing initially provided heat-tracing cable in individual, continuous sections along the lengths of and adjacent to said straight pipe sections, said joints and said elbow sections;
(b) providing routing guides over and/or under the lengthwise surfaces of only those segments of said cable adjacent to said joints and elbows so that segments of said cable adjacent to said straight pipe sections lie directly against their adjacent straight pipe sections;
(c) retaining said cable and routing guides in place adjacent to said joints and said elbow sections;
(d) while said cable and routing guides are so retained, placing a layer of thermal insulation over said straight pipe sections, said joints, and said elbow sections as well as the retained cable and routing guides so that opposite ends of said individual cable sections are readily accessible for connection with a source of electrical power and/or a replacement cable section said thermal insulation being designed so as to act on those segments of said cable adjacent said straight pipe sections in a way which causes the undersides of the cable segments acted upon to be pressed directly against their adjacent straight pipe sections along the entire lengths of said cable segments; and
(e) replacing any single, continuous, initially installed section of said cable by connecting one end of a new replacement cable section to an accessible end of the cable section to be replaced and pulling this latter cable section out from within said insulation layer by its otherwise free end, whereby to cause the replacement cable section to be pulled into the position vacated by the cable section being replaced and be acted upon by the thermal insulation in the same manner as the cable section being replaced.

18. In a heating and insulating arrangement for a network of installed pipes including straight pipe sections, segments of electrical heat-tracing cable directly adjacent to said pipe sections, channel assemblies positioned over but not under the lengthwise surfaces of said cable segments, and thermal insulation over said pipe sections, heat-tracing cable segments and channel members, the improvement comprising means forming part of said channel assemblies for pressing the adjacent cable segments directly against their respective pipe sections, said channel assemblies including channel members which are generally U-shaped and said pressing means including resilient material within said channel members above the outer lengthwise surface of the cable segments under said members.

19. In a heating and insulation arrangement for a network of installed pipes including straight pipe sections, segments of electrical heat-tracing cable directly adjacent to said pipe sections, channel assemblies positioned over but not under said lengthwise surfaces of said cable segments, and thermal insulation over said pipe sections, heat-tracing cable segments and channel members, the improvement comprising means forming part of said channel assemblies for pressing the adjacent cable segments directly against their respective pipe sections, said assemblies including channel members, each having an integrally formed lengthwise section thereof in engagement with an adjacent cable segment and serving as said pressing means.

20. The improvement according to claim 19 wherein the lengthwise section of each channel member extends into the rest of the channel member in a convex manner.

21. In a heating and insulating arrangement for a network of installed pipes including straight pipe sections, segments of electrical heat-tracing cable adjacent to said pipe sections, guide assemblies positioned at least over the lengthwise surfaces of said cable segments, the improvement comprising means forming part of said guide assemblies for directly engaging the adjacent cable segments and pressing the engaged segments in the direction of their respective pipe sections, said guide assemblies being configured to have closed cross sections such that a section of each guide assembly is disposed between an adjacent cable segment and pipe section and such that the adjacent cable segment is pressed against the adjacent section of the associates guide assembly.

22. A method of installing a readily bendable electrical heat-tracing cable on and insulating a network of already installed pipes including straight sections of pipes, straight joints, and elbow sections, said method comprising the steps of:
(a) placing said heat-tracing cable along the lengths of and adjacent to said straight pipe sections, said joints and said elbows;
(b) providing routing guides over the lengthwise surfaces of those segments of said cable adjacent said straight pipe sections;
(c) retaining said cable and routing guides in place adjacent to said straight pipe sections, said joints and said elbow sections;
(d) while said cable and routing guides are so retained, placing a layer of thermal insulation over said straight pipe sections, said joints, and said elbow sections as well as the retained cable and routing guides so that the cable is readily accessible at one or both ends thereof for connection with a source of power;
(e) causing said routing guides to act on those segments of said heat-tracing cable adjacent said straight pipe sections in a specific way which causes the undersides of the cable segments acted upon to be urged in the direction of their adjacent straight pipe sections along substantially the entire length of those cable segments whereby to remain as close as possible to the adjacent pipe sections; and (f) retaining said heat-tracing cable adjacent said straight pipe sections, said straight joints and said elbow sections in a way which allows segments of said cable to be replaced with new segments of cable which are acted upon by said routing guides in the same manner as the cable segments being replaced by pulling each cable segment to be replaced out of its originally installed position as a replacement cable is pulled therein.

23. A method according to claim 22 wherein said routing guides are configured so as to cause the undersides of the adjacent cable segments to be pressed directly against their adjacent straight pipe sections.

24. A method according to claim 22 wherein said routing guides includes bottom sections which extend under their adjacent cable segments and wherein said routing guides are configured so as to cause the undersides of the adjacent cable segments to be pressed directly against their adjacent routing guide bottom sections.

25. A heating and insulating arrangement for a network of pipes including straight sections of pipes, straight joints, and elbows, said arrangement comprising:
(a) heat-tracing cable placed along the lengths of and adjacent to said straight pipe sections, said joints and said elbows;
(b) routing guides positioned over and/or under the lengthwise surfaces of those segments of said cable adjacent to said joints and elbows;
(c) means for retaining said cable and routing guides in place adjacent to said straight pipe sections, said joints and said elbow sections;
(d) thermal insulation located over said straight pipe sections, said joints, and said elbow sections as well as the retained cable and routing guides so that the cable is readily accessible at one or both ends thereof for connection with a source of power;
(e) biasing means acting on those segments of said heat-tracing cable adjacent said straight pipe sections in a specific way which causes the undersides of the cable segments acted upon to be pressed directly against their adjacent straight pipe sections along substantially the entire length of those cable segments; and
(f) means for retaining said heat-tracing cable adjacent said straight pipe sections, said straight joints and said elbow sections in a way which allows segments of said cable to be replaced with new segments of cable which are acted upon by said routing guides in the same manner as the cable segments being replaced by pulling each cable segment to be replaced out of its originally installed position as a replacement cable is pulled therein.

26. An arrangement according to claim 25 including routing guides placed over and not under the outer lengthwise surfaces of those segments of said cable adjacent to said straight pipe sections, said last mentioned routing guides including means functioning as said biasing means.

27. An arrangement according to claim 26 wherein last-mentioned routing guides are in the form of channel assemblies including said biasing means.

28. An arrangement according to claim 27 wherein said channel assemblies include channel members and wherein said biasing means includes resilient spring members between a surface of said channel members and the outer lengthwise surfaces of the cable segments under said members.

29. An arrangement according to claim 27 wherein said channel assemblies include channel members which are generally U-shaped and wherein said biasing means includes resilient material within said channel members above the outer lengthwise surfaces of the cable segments under said members.

30. An arrangement according to claim 27 wherein said channel assemblies include channel members, each having an integrally formed lengthwise section thereof in engagement with an adjacent cable segment and serving as said biasing means.

31. An arrangement according to claim 25 wherein said heat tracing cable is configured in cross section to include a flat underside and an opposite flat top side.

* * * * *